United States Patent
Visenzi (10) Patent No.: US 10,787,216 B2
(45) Date of Patent: Sep. 29, 2020

(54) SYSTEM FOR FIXING AND TRANSPORTING STORAGE BAGS FOR MOTORCYCLES

(71) Applicant: GIVI S.p.A., Flero (BS) (IT)

(72) Inventor: Giuseppe Visenzi, Brescia (IT)

(73) Assignee: GIVI S.p.A., Flero (BS) (IT)

( * ) Notice: Subject to any disclaimer, the term of this patent is extended or adjusted under 35 U.S.C. 154(b) by 0 days.

(21) Appl. No.: 16/346,240

(22) PCT Filed: Nov. 2, 2017

(86) PCT No.: PCT/IB2017/056820
§ 371 (c)(1),
(2) Date: Apr. 30, 2019

(87) PCT Pub. No.: WO2018/083621
PCT Pub. Date: May 11, 2018

(65) Prior Publication Data
US 2020/0047836 A1   Feb. 13, 2020

(30) Foreign Application Priority Data

Nov. 4, 2016   (IT) .................. 102016000111303

(51) Int. Cl.
*B62J 7/04*   (2006.01)
*B62J 7/08*   (2006.01)
(Continued)

(52) U.S. Cl.
CPC . *B62J 7/08* (2013.01); *B62J 7/04* (2013.01); *B62J 9/26* (2020.02); *A45C 5/03* (2013.01); *A45C 13/385* (2013.01)

(58) Field of Classification Search
CPC ....... B62J 9/00; B62J 11/00; B62J 7/02; B62J 9/20; B60P 7/0807; B62H 5/001
See application file for complete search history.

(56) References Cited

U.S. PATENT DOCUMENTS 4,059,207 A * 11/1977 Jackson .................. A45F 3/50
224/413
4,266,703 A *  5/1981 Litz ........................ B62J 7/04
224/443
(Continued)

FOREIGN PATENT DOCUMENTS

CN         2540818 Y      3/2003
JP         3125023 U      9/2006
WO    WO 2012/052919 A1  4/2012

OTHER PUBLICATIONS

International Search Report dated Jan. 2, 2018 in PCT/IB2017/056820 filed on Nov. 2, 2017.
(Continued)

*Primary Examiner* — Brian D Nash
(74) *Attorney, Agent, or Firm* — Oblon, McClelland, Maier & Neustadt, L.L.P.

(57) ABSTRACT

A system for fixing and transporting a storage bag for motorcycles including a support frame fixed onto the motorcycle and a carriage. The carriage includes a lower shell, provided with a substantially flat support surface and with a first group of coupling means for removably connecting to the support frame, and an upper shell, provided with a substantially flat support surface and with a second group of coupling devices for removably connecting to the storage bag. The support frame is provided with a third group of coupling devices for removably connecting to the support surface of the lower shell, whereas the storage bag is provided with a fourth group of coupling means for removably connecting to the support surface of the upper shell.

14 Claims, 15 Drawing Sheets

(51) Int. Cl.
*B62J 9/26* (2020.01)
*A45C 5/03* (2006.01)
*A45C 13/38* (2006.01)

(56) References Cited

U.S. PATENT DOCUMENTS

| | | | | |
|---|---|---|---|---|
| 4,390,088 | A * | 6/1983 | Brenner | B62J 9/00 206/335 |
| 4,491,258 | A * | 1/1985 | Jones | B62J 9/00 224/153 |
| 5,568,890 | A * | 10/1996 | Magee | B60P 7/0807 224/42.32 |
| 5,609,278 | A * | 3/1997 | Fresco | A45F 3/04 224/153 |
| 6,585,465 | B1 * | 7/2003 | Hammond | B60P 7/0815 410/104 |
| 7,390,046 | B2 | 6/2008 | Ostroski | B62J 1/12 296/63 |
| 8,887,974 | B2 * | 11/2014 | Lindloff | B62J 9/20 224/443 |
| 9,650,096 | B2 * | 5/2017 | Visenzi | B62J 9/20 |
| 9,751,592 | B2 * | 9/2017 | Labbe | B60R 9/06 |
| 2003/0150894 | A1 | 8/2003 | Fang | |
| 2004/0011840 | A1 | 1/2004 | Lovett | |
| 2005/0116001 | A1 * | 6/2005 | Lee | B62H 5/00 224/430 |
| 2006/0138185 | A1 * | 6/2006 | Lien | B62J 7/00 224/427 |
| 2008/0073396 | A1 * | 3/2008 | Chiang | B62J 9/20 224/413 |
| 2011/0139843 | A1 * | 6/2011 | Thomas | B62J 1/28 224/413 |
| 2013/0043289 | A1 | 2/2013 | Visenzi | |
| 2013/0094920 | A1 * | 4/2013 | Massicotte | B60P 7/0815 410/82 |
| 2013/0168427 | A1 | 7/2013 | Visenzi | |
| 2016/0229474 | A1 * | 8/2016 | Carlson | B62J 7/04 |
| 2019/0308560 | A1 * | 10/2019 | Atkinson | B60P 7/0807 |

OTHER PUBLICATIONS

Colombian Office Action dated May 20, 2020, in Patent Application No. NC2019/0003957 (with English translation), 18 pages.

Chinese Office Action dated May 7, 2020, in the Patent Application No. 201780067482.4, with the English translation.

* cited by examiner

SYSTEM FOR FIXING AND TRANSPORTING STORAGE BAGS FOR MOTORCYCLES

The present invention refers to a system for fixing and transporting storage bags for motorcycles.

The use on motorcycles in general of top boxes, bags or cases adapted for housing baggage, helmets or other accessories is well known. Such cases consist of a cover and a bottom portion, as well as specific closing mechanisms. Such cases are usually applied in the rear part of the motorcycle and normally comprise a suitable frame, which is stably fixed to the motorcycle itself, and fastening systems to such a frame.

Usually, fastening systems are of the removable type and are provided in the bottom portion of the case, which can be made of fabric, of plastic or of metal. Consequently, when the user detaches the case from its support frame, he/she must transport the weight of such a case, with clear difficulties in the case in which the case is full and particularly heavy.

Cases for motorcycles provided with wheels, as for example described in document IT-A-1381509 to the same Applicant have thus been made. This case, totally similar to the most common travel trolleys, is however of predetermined dimensions. This means that the user, depending on his/her transportation requirements, should be able to have an indefinite number of cases for motorcycles provided with wheels. These cases, moreover, should all be provided with the same coupling and uncoupling mechanism with respect to the support frame to be able to be transported on the motorcycle.

The purpose of the present invention is therefore to make a system for fixing and transporting storage bags for motorcycles that is capable of overcoming the aforementioned drawbacks of the prior art in an extremely simple, cost-effective and particularly functional manner.

In detail, a purpose of the present invention is to make a system for fixing and transporting storage bags for motorcycles that is independent from the bag or case to which such a system can be applied.

Another purpose of the present invention is to make a system for fixing and transporting storage bags for motorcycles that can be connected to a plurality of support frames for cases for motorcycles.

A further purpose of the present invention is to make a system for fixing and transporting storage bags for motorcycles that can also be connected to a plurality of bags or cases for motorcycles.

Yet another purpose of the present invention is to make a system for fixing and transporting storage bags for motorcycles that can be used by the user for a plurality of cases in his/her possession.

These purposes according to the present invention are accomplished by making a system for fixing and transporting storage bags for motorcycles as outlined in claim 1.

Further characteristics of the invention are highlighted by the dependent claims, which are an integral part of the present description.

The characteristics and advantages of a system for fixing and transporting storage bags for motorcycles according to the present invention will become clearer from the following description, given as an example and not for limiting purposes, referring to the attached schematic drawings, in which.

With reference to the figures, a preferred embodiment of the system for fixing and transporting storage bags for motorcycles according to the present invention is shown. The fixing and transporting system comprises a carriage or trolley 10 in turn comprising a lower shell 12, provided with a substantially flat support surface and with a first group of coupling means for removably connecting to a fixed portion of the motorcycle, consisting of a support frame 100, and an upper shell 14, also provided with a substantially flat support surface and with a second group of coupling means for removably connecting to a storage bag or case for motorcycles 200.

Consequently, the support frame 100 is provided with a third group of coupling means for removably connecting to the support surface of the lower shell 12 of the carriage 10, whereas the case 200 is provided with a fourth group of coupling means for removably connecting to the support surface of the upper shell 14 of such a carriage 10. The fourth group of coupling means of the case 200 can in any case be configured to fasten such a case 200 directly to the support frame 100, like in the attachment systems according to the prior art.

Figure 1:
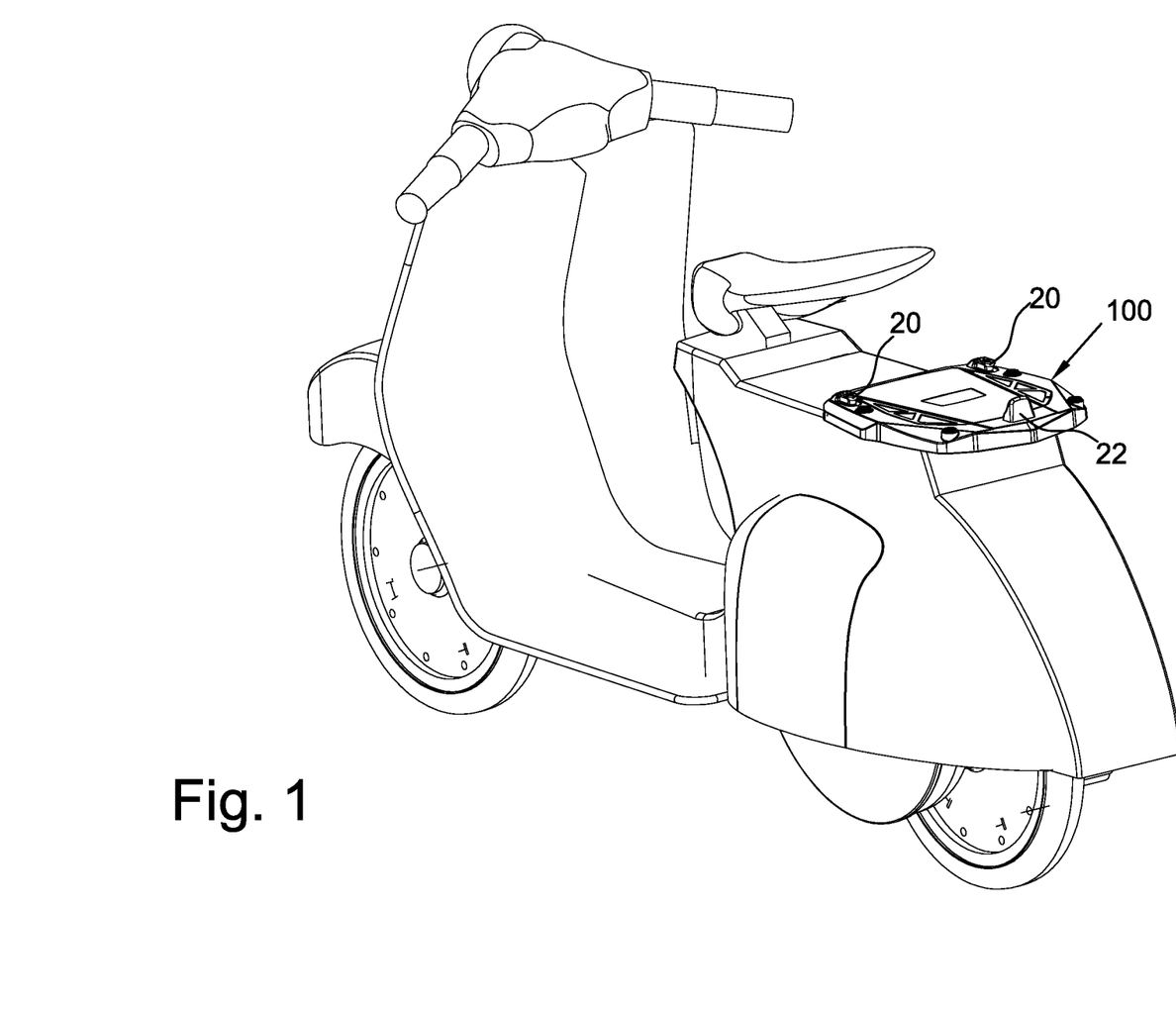
FIG. 1 is a perspective view di un support frame forming part of the system for fixing and transporting storage bags for motorcycles according to the present invention.
Figure 2:
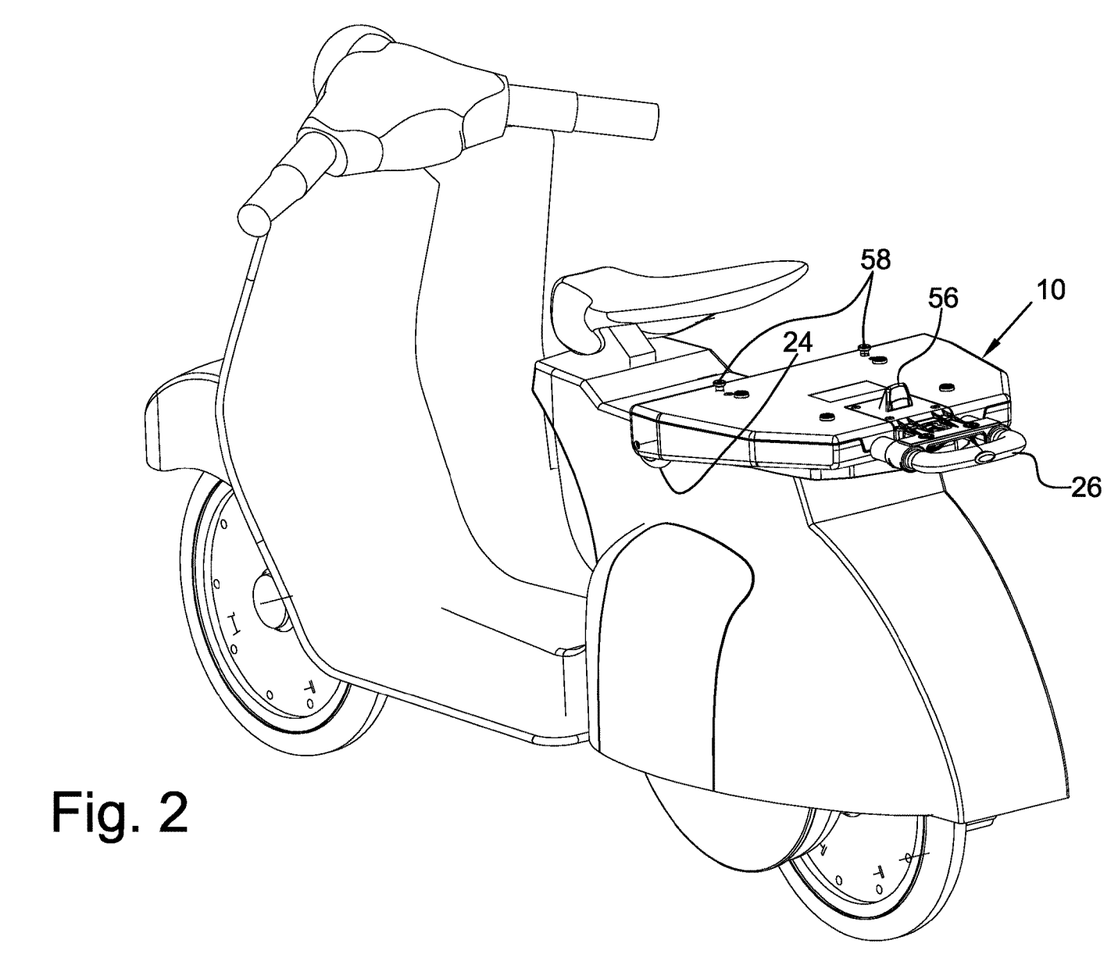
FIG. 2 is a perspective view of the support frame of FIG. 1, on which a carriage or trolley forming part of the system for fixing and transporting storage bags for motorcycles according to the present invention is mounted.
Figure 3:
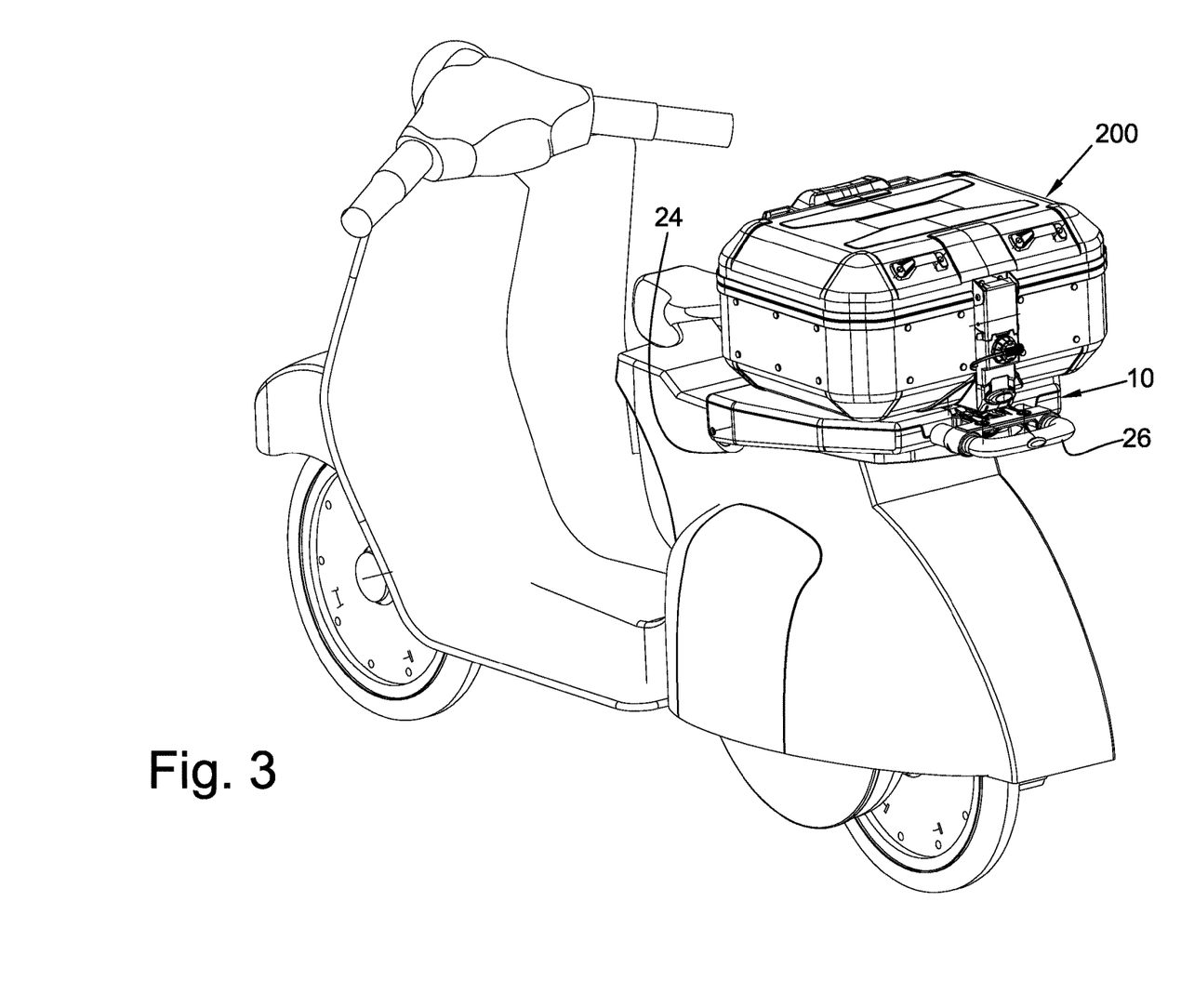
FIG. 3 is a perspective view of the support frame of FIG. 1 on which both the carriage or trolley of FIG. 2, and a storage bag for motorcycles are mounted.
Figure 4:
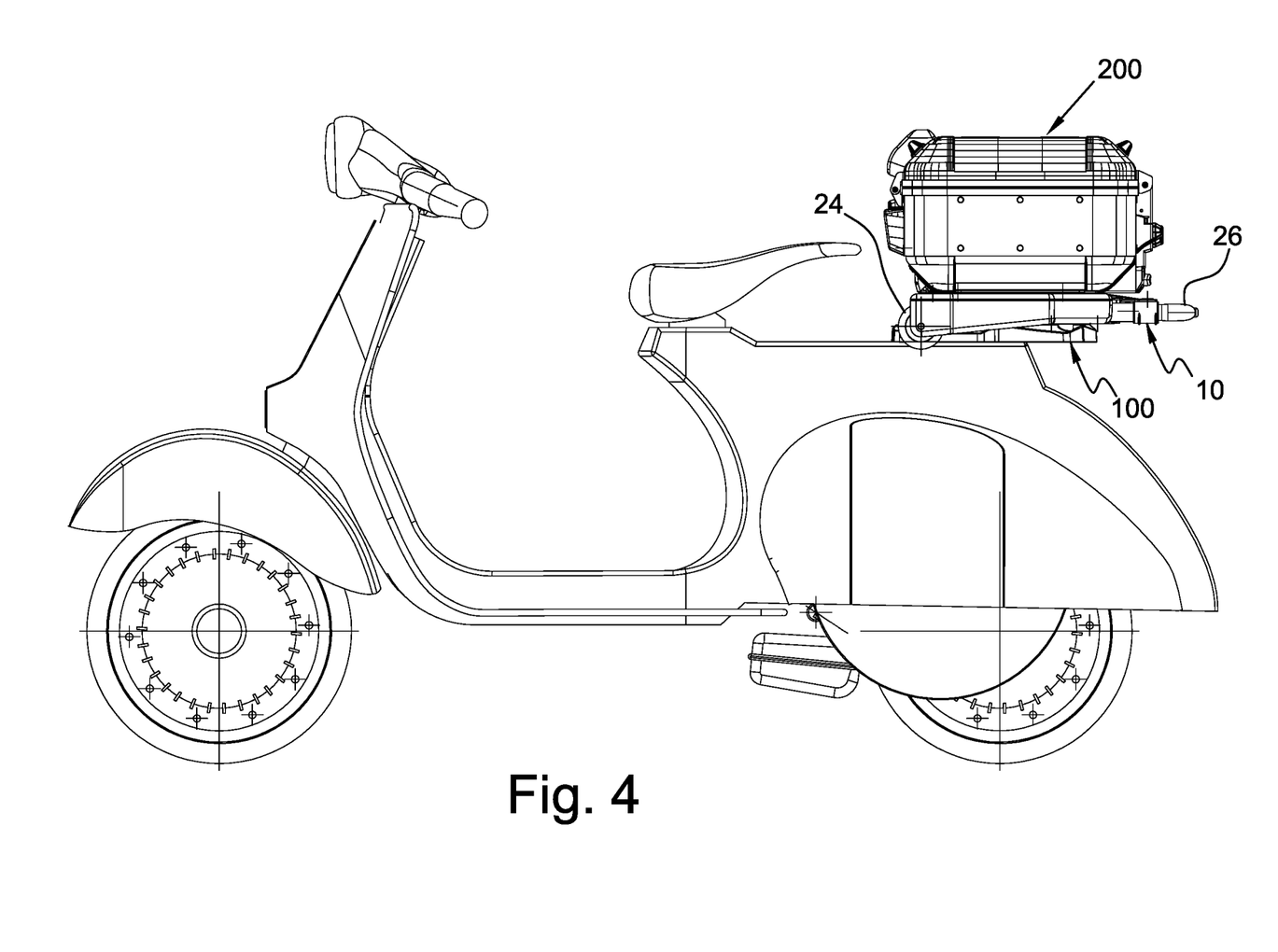
FIG. 4 is a side elevation view of the assembly shown in FIG. 3.
Figure 5A:
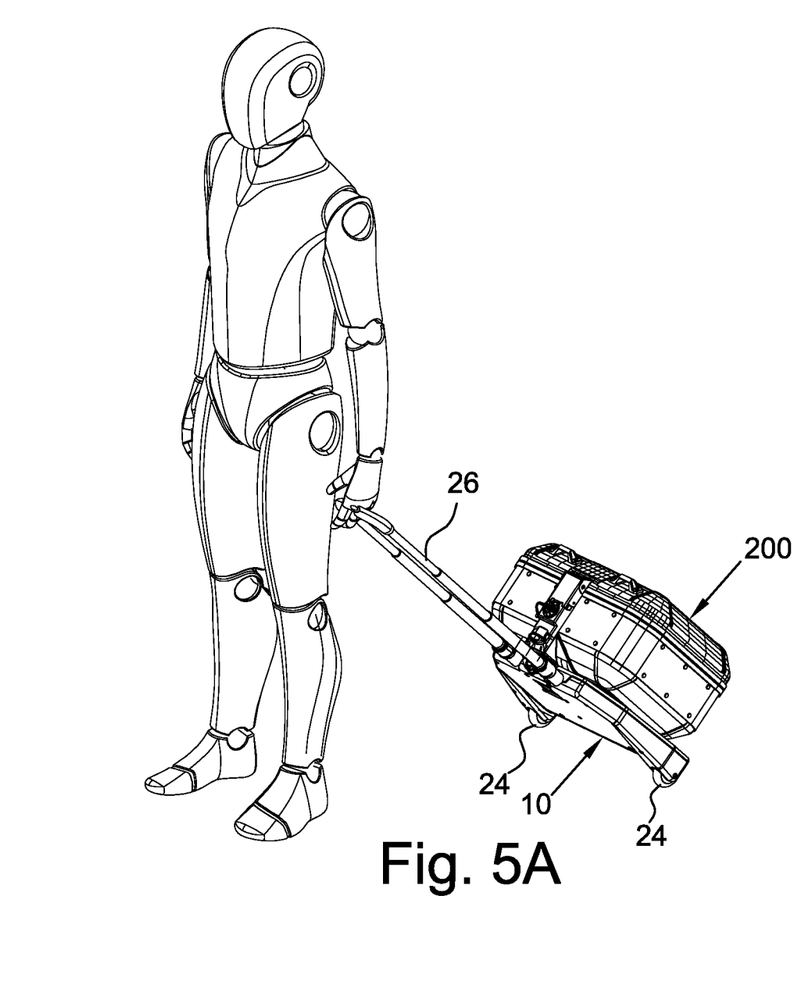
FIGS. 5A and 5B respectively show the transportation capacity by a user of the carriage or trolley of FIG. 2, on which a storage bag for motorcycles is applied.
Figure 5B:
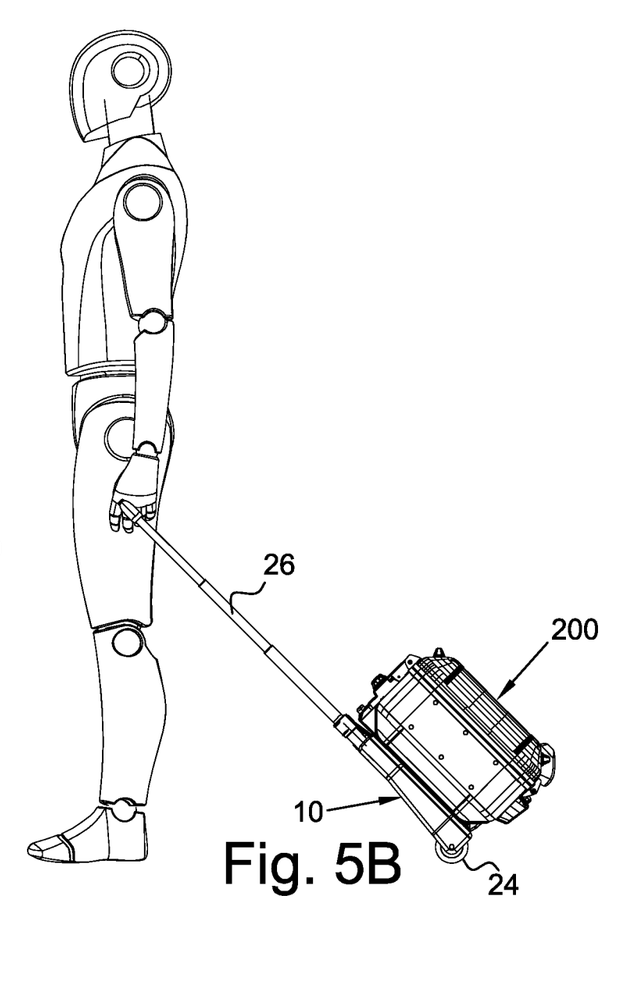
Figure 6:
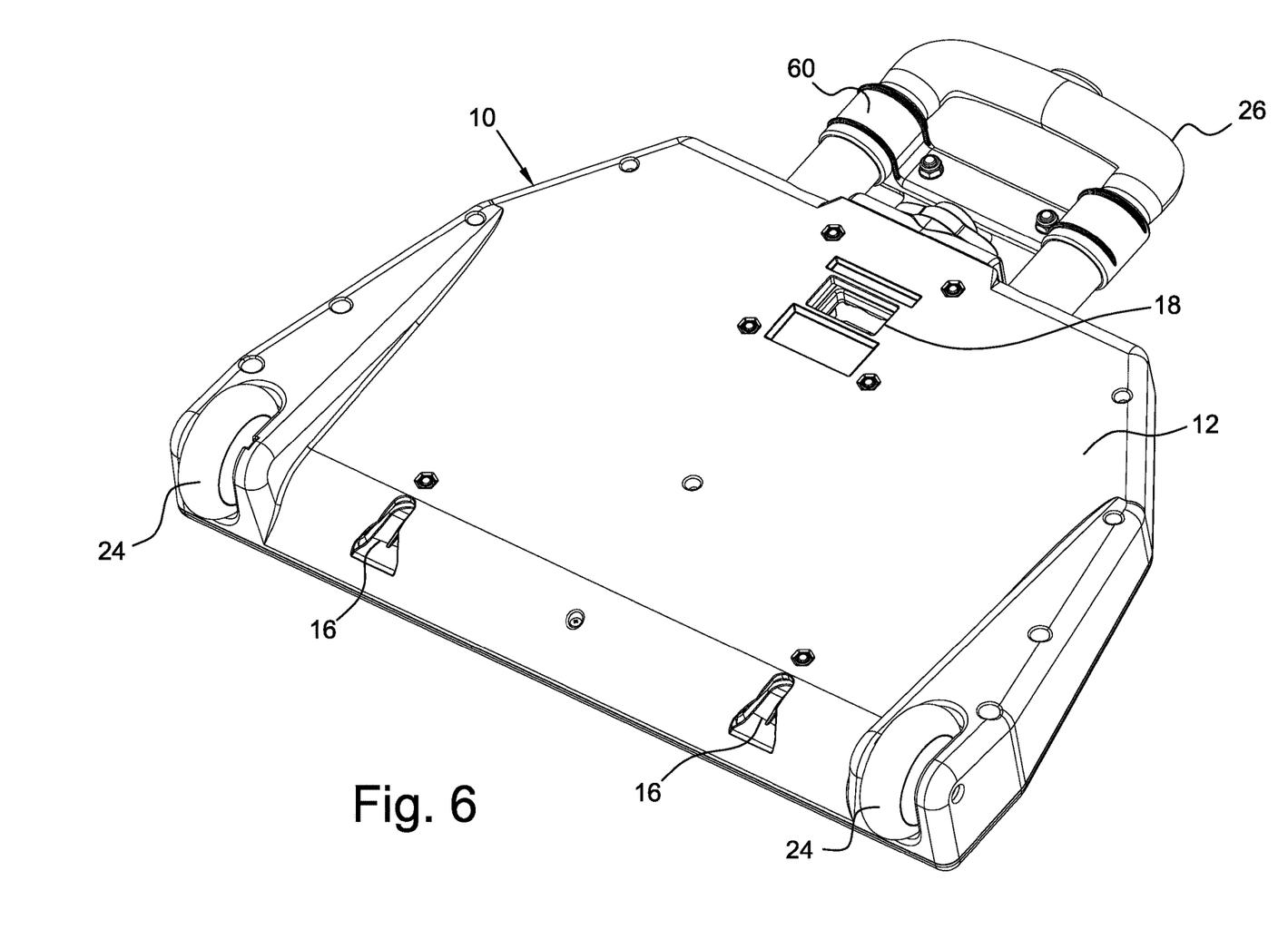
FIG. 6 is a perspective view, from the lower side, of the carriage of FIG. 2.

In detail, as shown for example in FIG. 6, on the support surface of the lower shell 12 of the carriage 10 one or more guide recesses 16 and at least one hole 18, preferably rectangular, which respectively allow the coupling with one or more shaped protrusions 20 and with at least one abutment and coupling lug 22 formed on the support frame 100 (FIG. 1) are formed in one piece. On the carriage 10, in particular on the lower shell 12, at least one pair of wheels 24 and at least one extendable handle 26 are also mounted, arranged for moving on the ground the assembly consisting of the carriage 10 and the case 200 when uncoupled from the support frame 100, as shown in FIGS. 5A and 5B.

Figure 7:
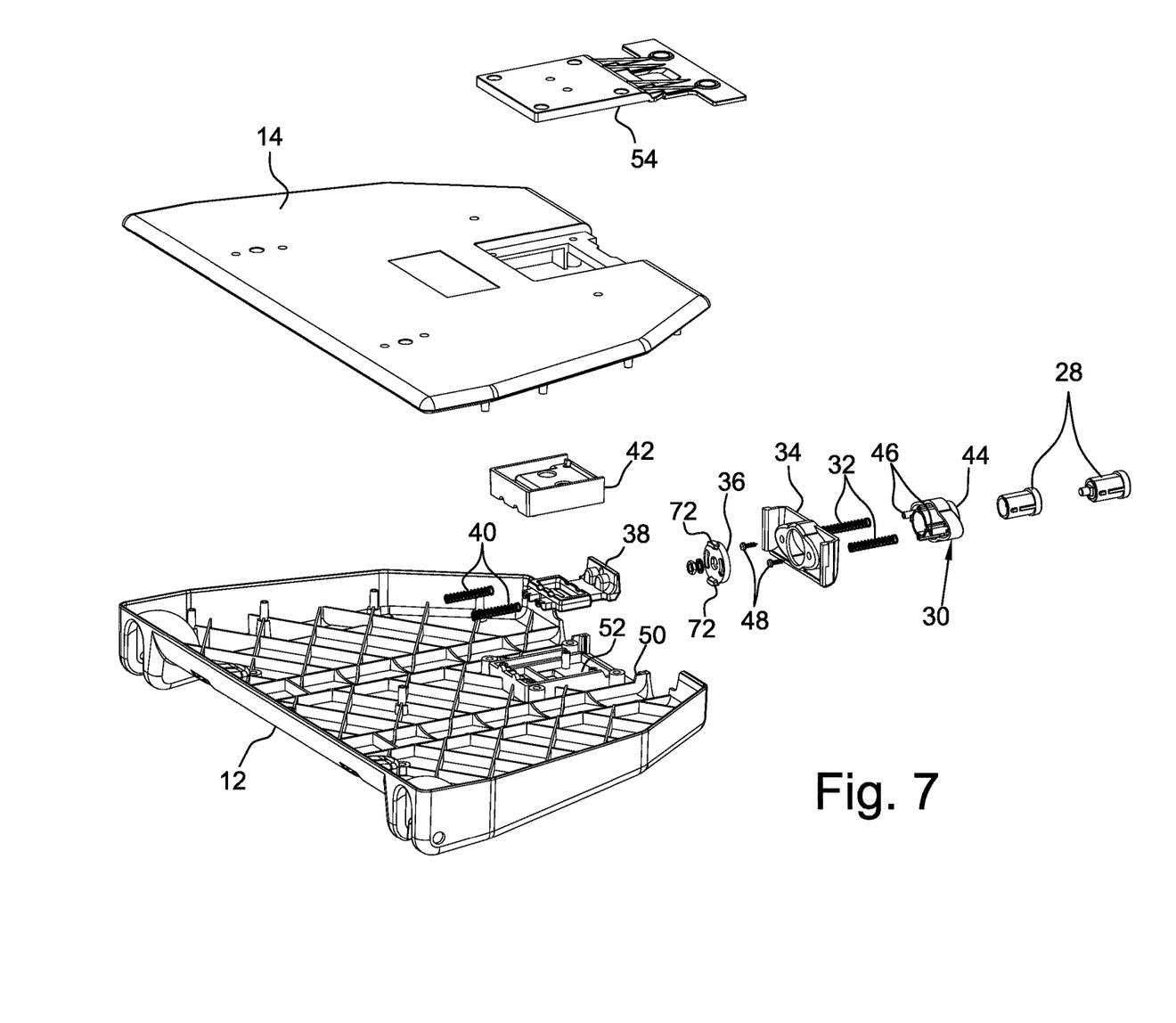
FIG. 7 is an exploded view showing the components of the closure mechanism of the carriage or trolley of FIG. 2.
Figure 8:
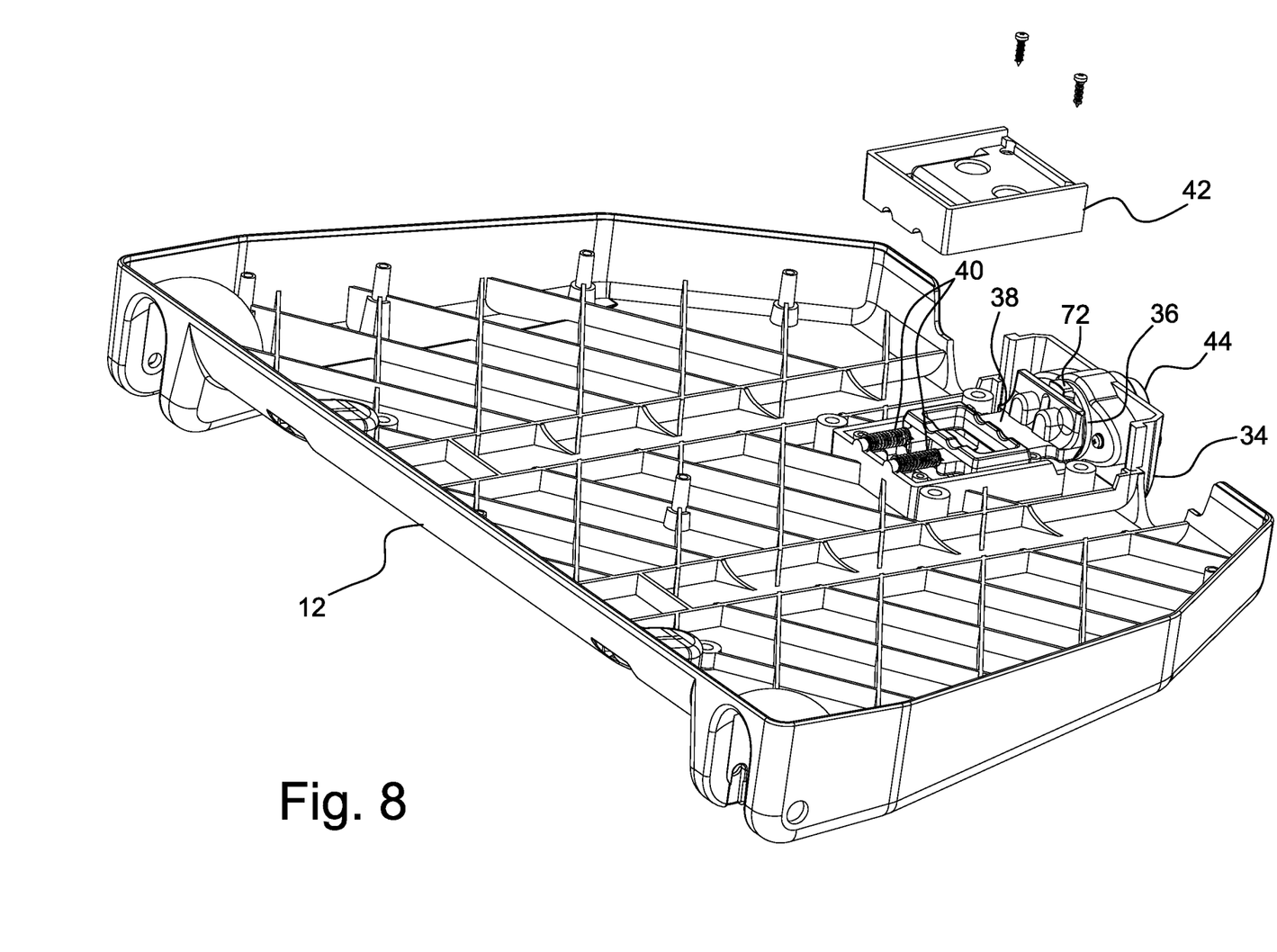
FIG. 8 is another exploded view showing a part of the components of FIG. 7.
Figure 9:
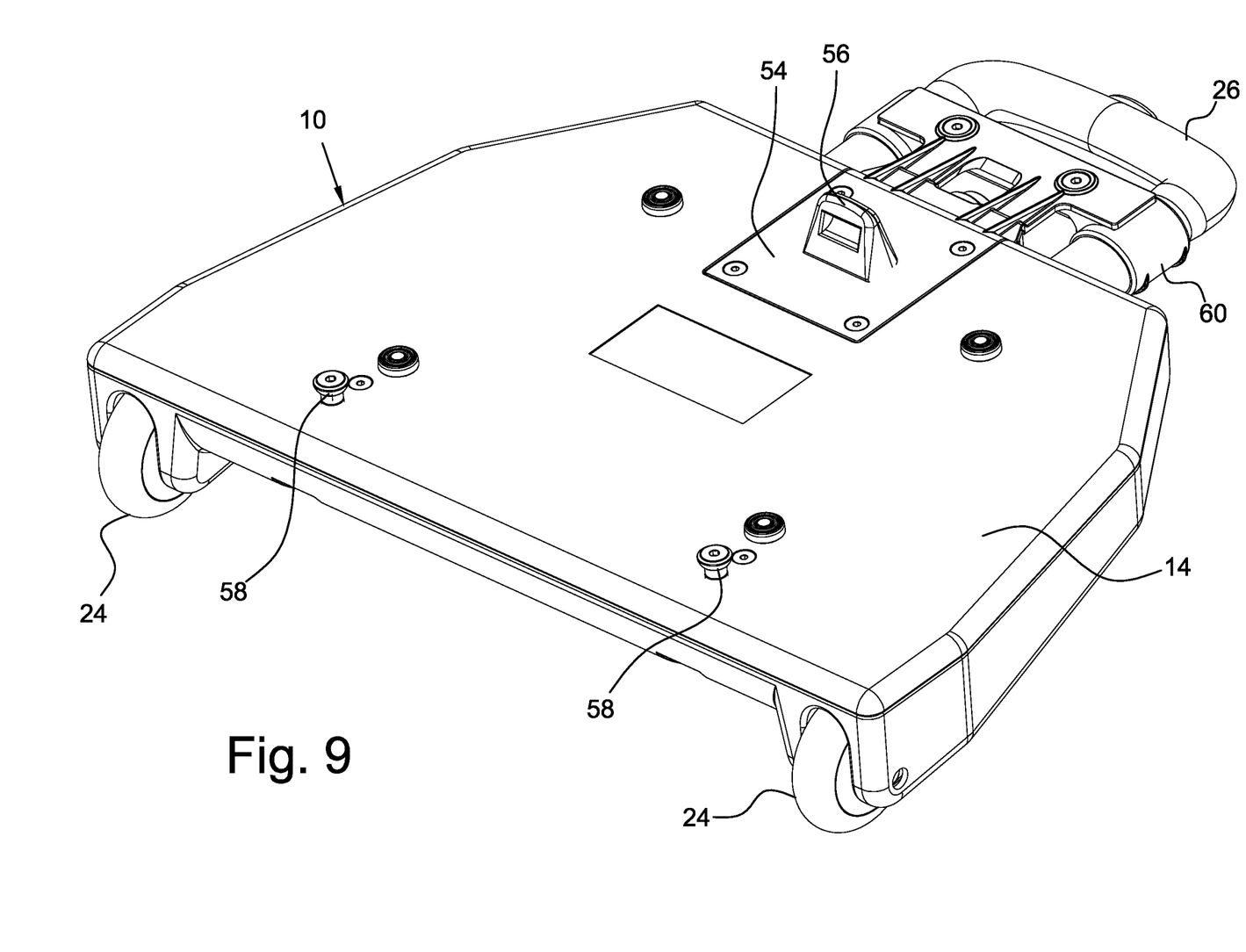
FIG. 9 is another perspective view, from the upper side, of the carriage or trolley of FIG. 2.

The carriage 10 further comprises a closure mechanism housed in an interspace between the lower shell 12 and the upper shell 14. The closure mechanism is provided with a key (not shown) and is arranged to selectively lock the coupling of the carriage 10 on the support frame 100, as well as to prevent ill-intentioned people to remove the assembly consisting of such a carriage 10 and the case 200 with respect to the support frame 100. The closure mechanism, the main components of which are shown in FIG. 7, is assembled in the area close to the rectangular hole 18.

Again with reference to FIG. 7, the closure mechanism is formed from the following components:
- a cylinder unit 28 for a lock, provided with a key (not shown);
- a release button 30;
- one or more return springs 32 of the release button 30;
- a fixed plate 34 for housing the release button 30;
- a movable under-lock plate 36;
- a latch 38;
- one or more return springs 40 of the latch 38; and
- a cover casing 42 of the closure mechanism.

The cylinder unit 28 is inserted in a corresponding seat 44 formed on the release button 30. The return springs 32 of the same release button 30 are thus mounted on suitable pins 46 of the release button 30. This sub-assembly is thus inserted in the fixed plate 34 for housing the release button 30. The release button 30 is elastically held on the fixed housing plate 34 through two screws 48 and through the interposition of the respective return springs 32, whereas the movable under-lock plate 36 is fixed to the cylinder unit 28 with known fixing means (threaded nut, Seeger ring, etc.).

In this way, by rotating the key, a corresponding rotation both of the cylinder unit 28, and of the movable under-lock plate 36 is generated. Pressing the release button 30 thus obtains the linear movement of the assembly consisting of the release button 30, the cylinder unit 28 and the movable under-lock plate 36. Vice-versa, by releasing the release button 30, the action of the return springs 32 of such a release button 30 takes the aforementioned assembly back into the initial rest position.

The fixed plate 34 for housing the release button 30, pre-mounted as described above, is coupled with the lower shell 12 of the carriage 10. In particular, the fixed plate 34 for housing the release button 30 is inserted in a corresponding track seat 50 formed inside the lower shell 12 of the carriage 10. The latch 38, complete with the return springs 40 of such a latch 38, is positioned in a respective seat 52 arranged close to the track seat 50 and is thus locked in its position by screwing the cover casing 42 of the closure mechanism on the lower shell 12.

The carriage 10 is thus completed by fixing the upper shell 14 on the lower shell 12, so as to enclose the closure mechanism. An insert 54 on which at least one abutment lug 56 is fixed is thus made integral on the support surface of the upper shell 14, whereas one or more shaped pins 58 are directly made integral on such a support surface of the upper shell 14. The shaped pins 58 and the abutment lug 56 of the insert 54 act as coupling means for fixing the case 200 on the carriage 10.

The fixing of the upper shell 14 on the lower shell 12 is carried out through screws, so as to make a single body with substantial structural rigidity. In order to complete the carriage 10 it is possible to provide a guide means 60 to stabilise the extendable handle 26 in its totally open position. The position of the various components of the carriage 10 is illustrated in FIGS. 6 to 9.

Figure 10:
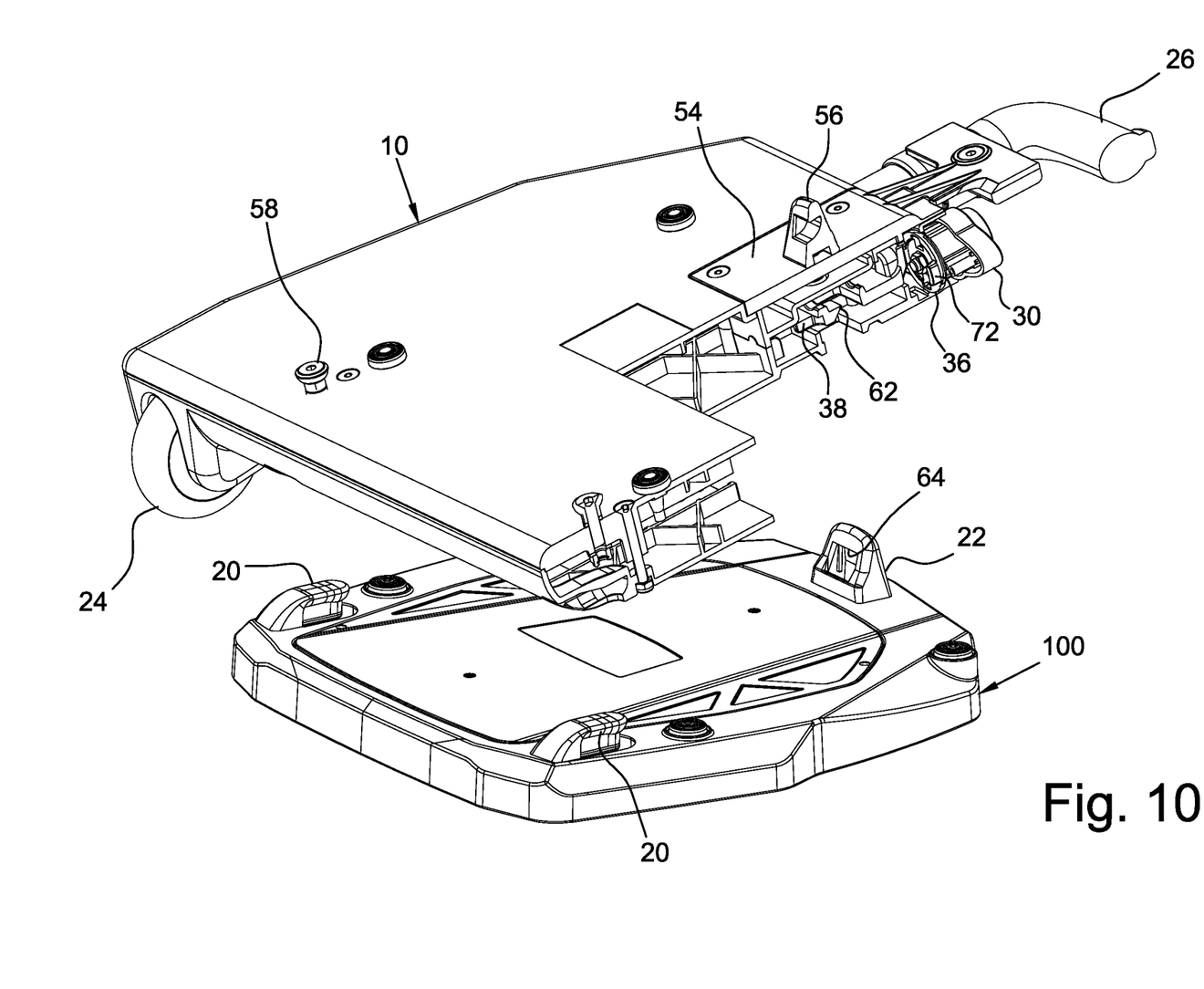
FIGS. 10 and 11 are perspective views, in partial section, showing two different mounting steps of the carriage or trolley of FIG. 2 on the support frame of FIG. 1.
Figure 11:
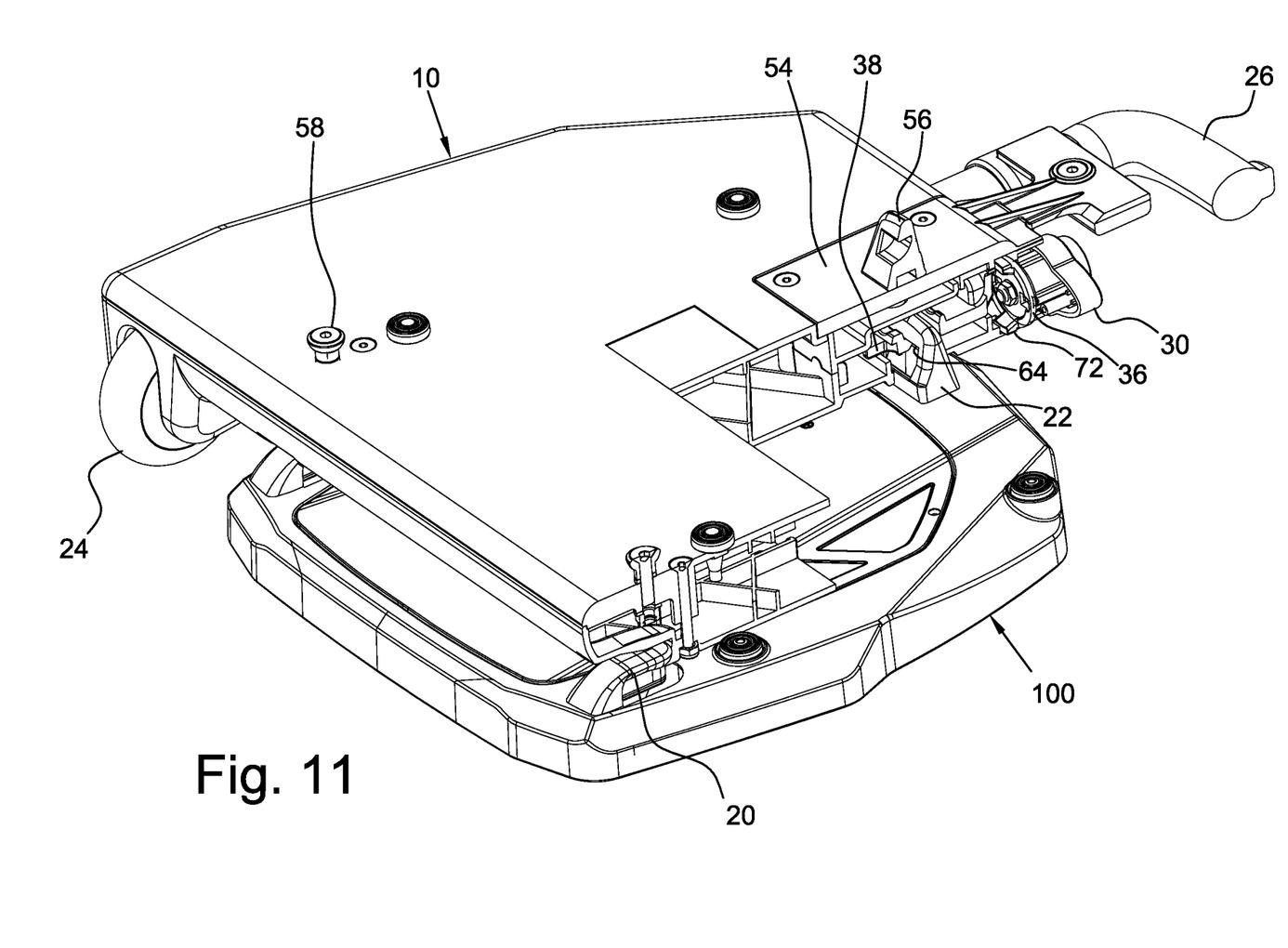

The operation of the fixing and transportation system according to the present invention takes place in the following way. A first step consists of coupling the carriage 10 with the support frame 100 of the motorcycle, as shown in FIGS. 10 and 11. In order to fix the carriage 10 to the support frame 100 it is sufficient to couple the guide recesses 16 of the lower shell 12 with the shaped protrusions 20 of the support frame 100 and then, by rotating the carriage 10 towards such a support frame 100, ensure that the abutment and coupling lug 22 formed on the support frame 100 enters into the rectangular hole 18 and engages with the latch 38.

When the abutment and coupling lug 22 comes into contact with the latch 38, thanks to the action of two inclined planes the latch 38 itself moves back, which then under the action of the respective return springs goes back into its rest position. In this rest position the latch 38, engaging its tooth 62 with a cavity 64 formed in the abutment and coupling lug 22 (FIG. 11), definitively fastens the carriage 10 to the support frame 100. The fastening of the carriage 10 to the support frame 100 can take place without distinction with the key of the closure mechanism in closed or open position.

Figure 12:
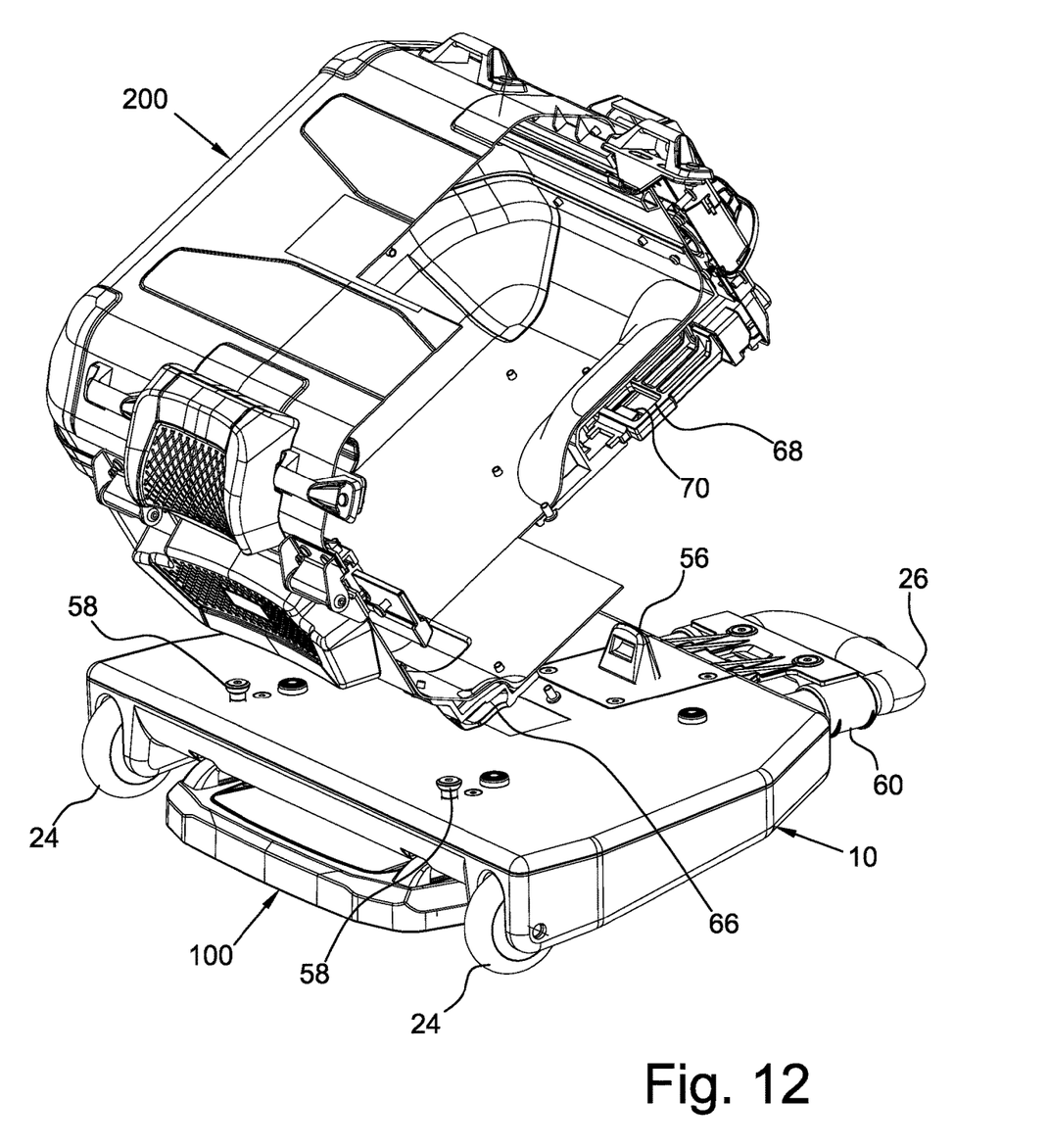
FIGS. 12 and 13 are perspective views, in partial section, showing two different mounting steps of a storage bag for motorcycles on the assembly consisting of the carriage or trolley of FIG. 2 and the support frame of FIG. 1.
Figure 13:
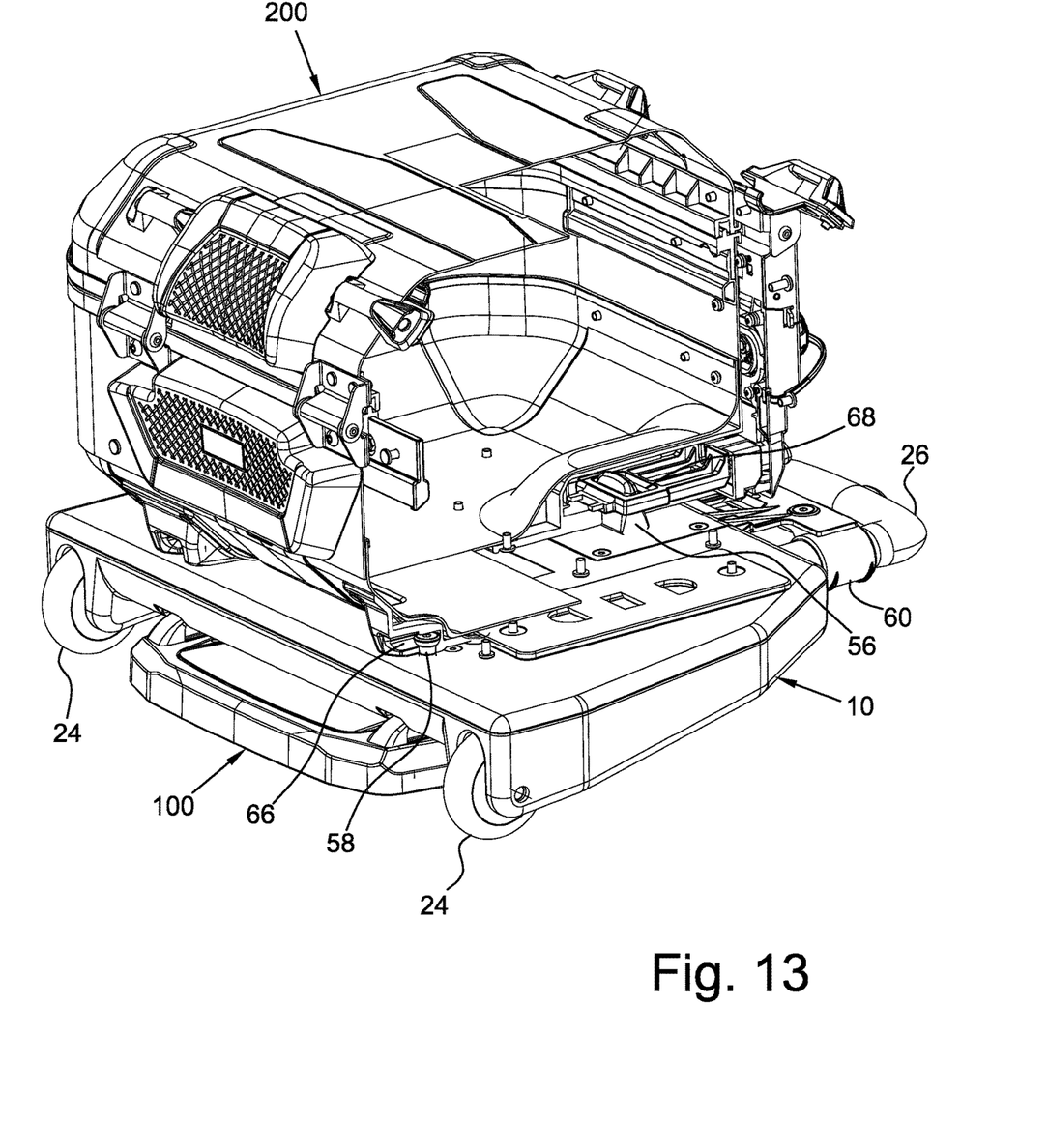

A second step consists of fixing the case 200 on the carriage 10, as shown in FIGS. 12 and 13. The fixing of the case 200 on the carriage 10 is carried out in an equivalent manner to what is described above with reference to the coupling of the carriage 10 with the support frame 100 of the motorcycle. It is thus necessary to couple one or more recesses 66, formed on a bottom portion of the case 200, with the corresponding shaped pins 58 obtained on the support surface of the upper shell 14. At this point, by rotating the case 200 towards the support surface of the upper shell 14, it is ensured that the abutment lug 56 of such an upper shell 14 enters into at least one corresponding hole 68 formed on the bottom portion of the case 200 and engages with a bolt 70 of such a case 200.

Figure 14:
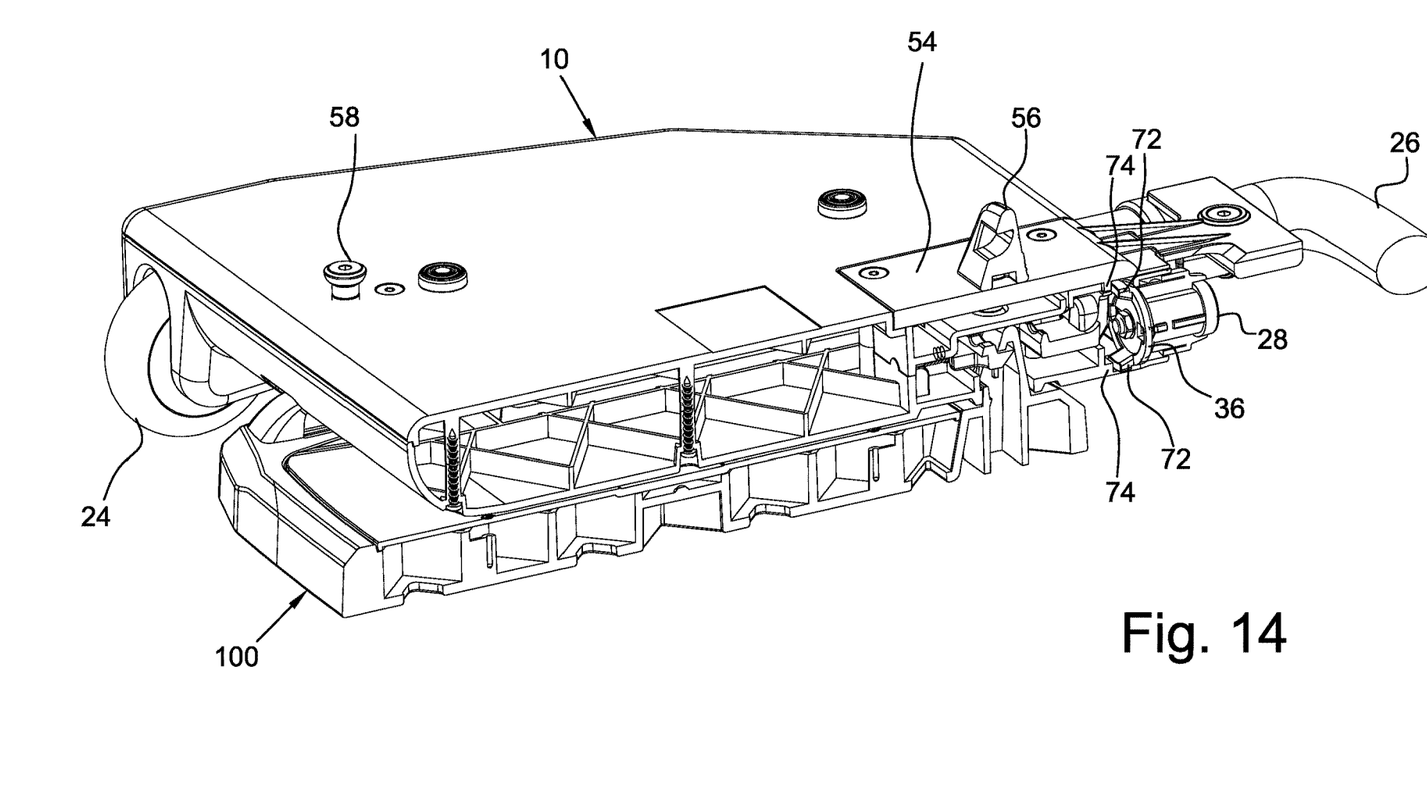
FIGS. 14 and 15 are perspective views, in partial section, showing two different release steps of the carriage or trolley of FIG. 2 from the support frame of FIG. 1.
Figure 15:
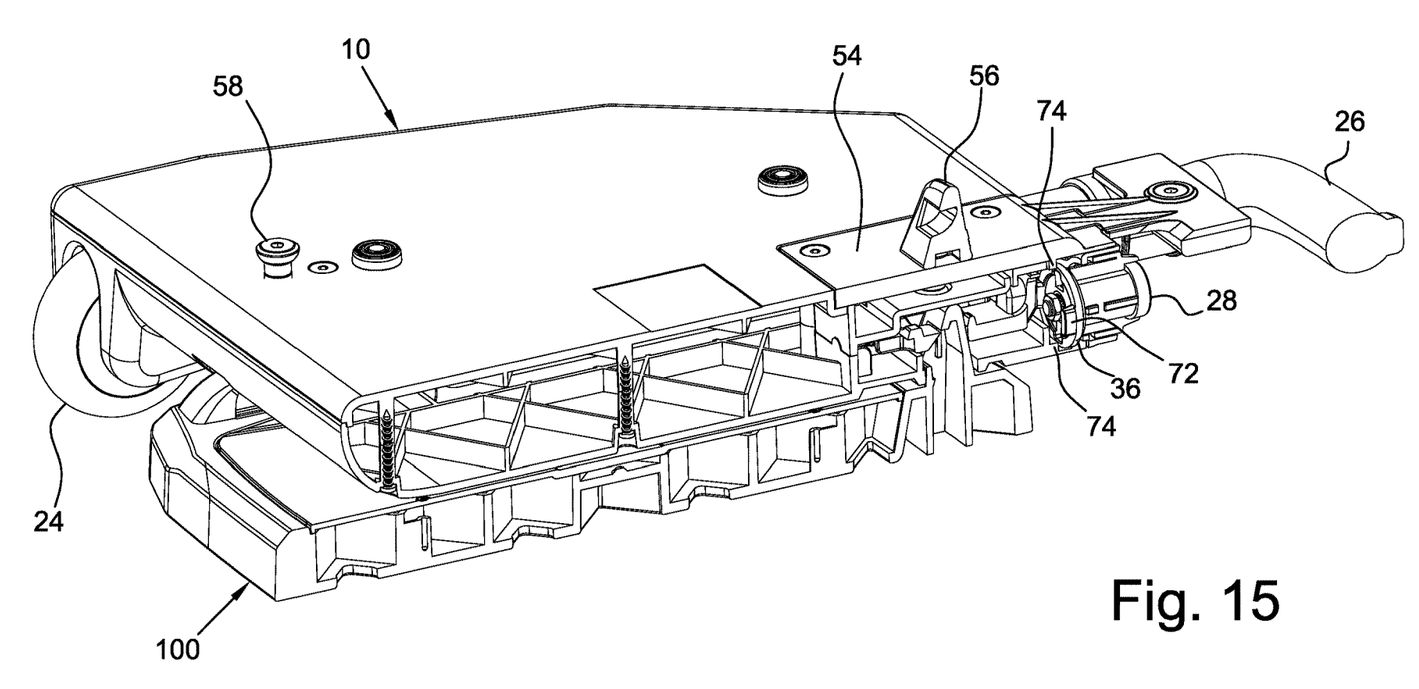

A third step consists of decoupling the carriage with respect to the support frame 100 of the motorcycle, as shown in FIGS. 14 and 15. It should be noted that the way of decoupling the carriage 10 with respect to the support frame 100 of the motorcycle is the same irrespective of whether a case 200 is mounted on such a carriage 10. With the cylinder unit 28 in closed position (key horizontal) it is not possible to release the carriage 10 from the motorcycle, since the locking teeth 72 of the movable under-lock plate 36 interfere with corresponding walls 74 formed on the lower shell 12 and/or on the insert 54 of the upper shell 14, making it impossible to press the release button 30.

By rotating the key by 90°, and consequently the cylinder unit 28 and the movable under-lock plate 36 by the same angle, the interference of the locking teeth with the walls 74 formed on the lower shell 12 and/or on the insert 54 of the upper shell 14 is zeroed. In this configuration it is thus possible to press the release button 30 inwards and, consequently, to move the latch 38 freeing it from the engagement with the abutment and coupling lug 22 of the support frame 100. At this point it is possible to remove the carriage 10 from the support frame 100 and thus from the motorcycle. Once the carriage 10 has been released from the motorcycle, the action of the return springs 40 of the latch 38 takes such a latch 38 back into its rest position, arranging the fixing and transportation system for future fastening.

The further steps of releasing the case 200 from the carriage 10, as well as of using/transporting the carriage 10 provided with case 200 (as shown for example in FIGS. 5A and 5B), are carried out according to known methods of the state of the art. For example, the release of the case 200 from the carriage can be carried out by acting on the group of coupling means of such a case 200, whereas the extraction of the extendable handle 26 and the transportation of the carriage 10 are known and commonly-used operations.

It has thus been seen that the system for fixing and transporting storage bags for motorcycles according to the present invention achieves the purposes highlighted earlier.

The system for fixing and transporting storage bags for motorcycles of the present invention thus conceived can in any case undergo numerous modifications and variants, all of which are covered by the same inventive concept; moreover, all of the details can be replaced by technically equivalent elements. In practice the materials used, as well as the shapes and sizes, can be whatever according to the technical requirements.

The scope of protection of the invention is therefore defined by the attached claims.

The invention claimed is:

1. A system for fixing and transporting a storage bag for motorcycles, the system comprising:
    a support frame fixed on the motorcycle; and
    a carriage comprising, in turn, a lower shell, provided with a substantially flat support surface and with a first group of coupling means for removably connecting to said support frame and an upper shell, also provided with a substantially flat support surface and with a second group of coupling means for removably connecting to the storage bag,
    wherein the support frame is provided with a third group of coupling means for removably connecting to the support surface of the lower shell of the carriage, wherein the storage bag is provided with a fourth group of coupling means for removably connecting to the support surface of the upper shell of said carriage, wherein on the lower shell of the carriage at least one pair of wheels and at least one extendable handle are mounted, arranged for moving on the ground the assembly consisting of the carriage and of the storage bag when uncoupled from the support frame, and wherein the carriage comprises a closure mechanism housed in an interspace between the lower shell and the upper shell, said closure mechanism being provided with a key and being arranged to selectively lock the coupling of the carriage on the support frame as well as to prevent the undesired removal of the assembly consisting of said carriage and of the storage bag with respect to the support frame.

2. The system according to claim 1, wherein the first group of coupling means comprises one or more guide recesses and at least one hole, which are obtained on the support surface of the lower shell of the carriage.

3. The system according to claim 2, wherein the third group of coupling means comprises one or more shaped protrusions and at least one abutment and coupling lug, which are obtained on the support frame, said one or more guide recesses and said at least one hole being arranged for coupling with said one or more shaped protrusions and with said at least one abutment and coupling lug respectively, said at least one abutment and coupling lug being provided with a means for engaging with said closure mechanism.

4. The system according to claim 1, wherein the second group of coupling means comprises at least one abutment lug and one or more shaped pins which are obtained on the support surface of the upper shell of the carriage.

5. The system according to claim 4, wherein said at least one abutment lug is fixed on an insert made integral on the support surface of the upper shell of the carriage.

6. The system according to claim 4, wherein the fourth group of coupling means comprises one or more recesses, at least one hole and one bolt which are obtained on a bottom portion of the storage bag, said one or more recesses being arranged for the coupling with said one or more shaped pins, while said abutment lug is arranged to insert in said at least one hole and to engage with said bolt.

7. The system according to claim 1, wherein said closure mechanism comprises:
    a cylinder unit for a lock, which is provided with a key and which is rotatable to take a closed position and an open position;
    a release button, operable in the opening position of said cylinder unit;
    a movable under-lock plate, which is rotatable integrally with respect to said cylinder unit to selectively lock the coupling of the carriage on the support frame; and
    a latch, operatively connected to said release button to disengage the carriage from the support frame.

8. The system according to claim 7, wherein the movable under-lock plate is provided with locking teeth arranged to interfere, when the cylinder unit is in the closed position, with corresponding walls obtained on the lower shell and/or on the upper shell, thus locking the release button and preventing the disengagement of the carriage from the support frame.

9. The system according to claim 7, wherein said closure mechanism also comprises one or more return springs of the release button, which are arranged to linearly move the assembly consisting of said release button, the cylinder unit and the movable under-lock plate further to the release of said release button and to bring said assembly back to its rest position.

10. The system according to claim 9, wherein the cylinder unit is inserted in a corresponding seat obtained on the release button, said one or more return springs of the release button being mounted on corresponding pins of said release button.

11. The system according to claim 9, wherein said closure mechanism also comprises one or more return springs of the latch, arranged to bring said latch back to its rest position, wherein a tooth of said latch engages with the third group of coupling means to retain the carriage on the support frame.

12. The system according to claim 11, wherein said closure mechanism also comprises a fixed plate for housing the release button, inserted in a corresponding track seat obtained inside the lower shell of the carriage, wherein said release button is elastically retained on said housing fixed plate by means of with screws and by means of with the interposition of the respective return springs.

13. The system according to claim 12, wherein said closure mechanism also comprises a cover casing of the closure mechanism, said latch and said one or more return springs of said latch being positioned in a respective seat placed close to the track seat and being locked in their position by screwing said cover casing on the lower shell of the carriage.

14. The system according to claim 1, wherein the carriage is provided with a guide means for stabilizing the extendable handle in its fully open position.

* * * * *